United States Patent
Sacca (10) Patent No.: US 6,427,011 B1
(45) Date of Patent: Jul. 30, 2002

(54) MODEM DATA ACCESS ARRANGEMENT WITHOUT DIODE BRIDGE

(75) Inventor: Frank Sacca, Diamond Bar, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/616,097

(22) Filed: Jul. 14, 2000

(51) Int. Cl.[7] .......................... H04M 1/00; H04M 9/00; H04M 11/00; H04M 3/22

(52) U.S. Cl. ..................... 379/399.01; 379/399.02; 379/26.01; 379/26.02; 379/412; 379/27.01; 379/93.05

(58) Field of Search ................. 379/165, 27.01, 379/27.08, 26.01, 26.02, 399.01, 399.02, 93.05

(56) References Cited

U.S. PATENT DOCUMENTS

| | | | |
|---|---|---|---|
| 4,292,476 A | * 9/1981 | Yamamoto et al. | 379/165 |
| 4,651,340 A | * 3/1987 | Marson | 379/156 |
| 4,679,224 A | * 7/1987 | Lynch et al. | 379/26 |
| 4,972,457 A | * 11/1990 | O'Sullivan | 379/59 |
| 4,991,196 A | * 2/1991 | Krebs | 379/27 |
| 6,081,586 A | * 6/2000 | Rahamim et al. | 379/93.29 |
| 6,104,230 A | * 8/2000 | Jarcy | 327/483 |

OTHER PUBLICATIONS

Newton, H.; Newton's Telecom Dictionary, 1999, Miller Freeman, Inc., 15th Edition, p. 236.*

* cited by examiner

Primary Examiner—Forester W. Isen
Assistant Examiner—Ramnandan Singh
(74) Attorney, Agent, or Firm—Foley & Lardner (57) ABSTRACT

Computers commonly connect to remote computers and networks using the telephone lines. A telephone line is composed of a positive line (Ring) and a negative line (Tip). Because there is no guarantee, in general, which line on a two-conductor telephone jack will be positive and which will be negative, diode bridges are often used to assure correct polarity of devices coupled to the telephone lines. Commonly computers connect to telephone lines using modems, which plug into the computer. The modems often contain two jacks, one to connect the modem to the telephone line, the other to provide an outlet for a telephone. Commonly both jacks are wired in parallel. Embodiments of the inventions provide for wiring the telephone jacks in opposite polarity, or switching polarity via jumpers. A method is provided to detect a telephone plug in the jack of incorrect polarity. A user may be instructed in advance or prompted to switch jacks or jumpers if necessary and the need for the diode bridge is eliminated.

28 Claims, 12 Drawing Sheets

MODEM DATA ACCESS ARRANGEMENT WITHOUT DIODE BRIDGE

FIELD OF THE INVENTION

The present invention relates to communication systems, methods and devices used to communicate data between computers and in particular embodiments to telephone line coupled modem systems, methods and devices.

BACKGROUND OF THE INVENTION

The need to communicate between distant computers has led to the use of telephone lines for data communication. The telephone lines are a natural choice for communications because of their ubiquitous nature and ability for dedicated instantaneous transmission between points. Modems are often used to communicate data between computers across a telephone line. A modem is a device that accepts digital data (for example, from a computer) and uses the data to modulate an analog signal for transmission across a telephone line. At the receiving end of the transmission another modem converts the analog information sent by the first computer and modem to digital data by demodulating the analog signal. The process of MODulating a signal on the sending end and DEModulating the signal on the receiving end is how the term "MODEM" was derived.

Figure 1A:
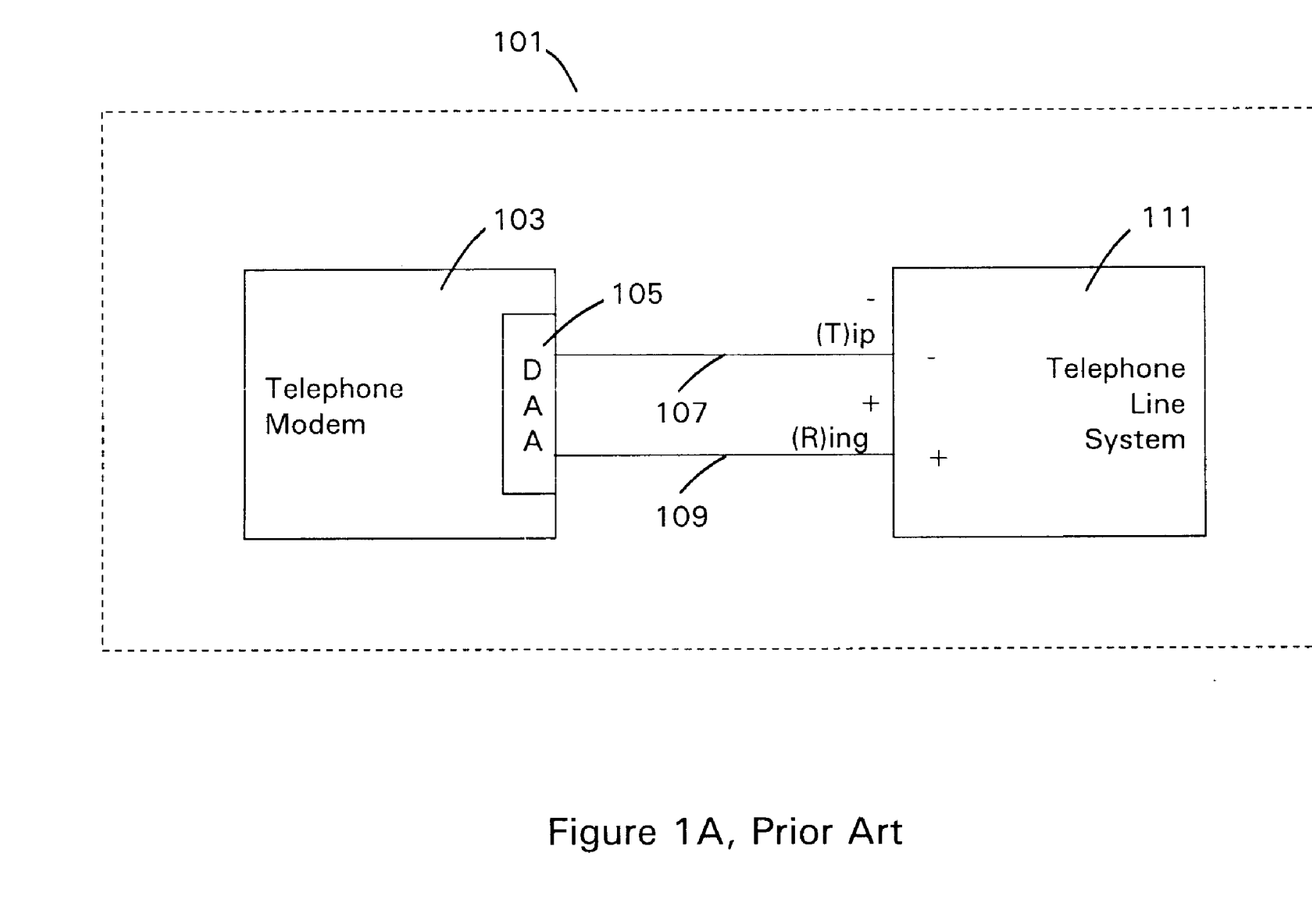
FIG. 1A is a block diagram of a common telephone modem interconnected to the telephone system.

FIG. 1A illustrates a block diagram of a telephone modem coupled to a telephone line. In FIG. 1A the modem system 101 functionally comprises two blocks. The first block 103 is the actual telephone modem, which includes a telephone line interface circuit or Data Access Arrangement (DAA) 105. The second block 111 is the plain old telephone system (POTS) 111 which both accepts information from and provides information to the DAA 105 portion of the telephone modem 103. The telephone modem 103 commonly couples to the telephone system 111 via two telephone line terminals commonly denominated Tip or "T" 107 and Ring or "R" 109. The data access arrangement 105 provides the interface between the telephone modem 103 and the analog telephone system 111. The DAA 105 is typically an isolated Analog Front End (AFE), which the telephone modem uses to interface to the analog telephone system 111.

Figure 1B:
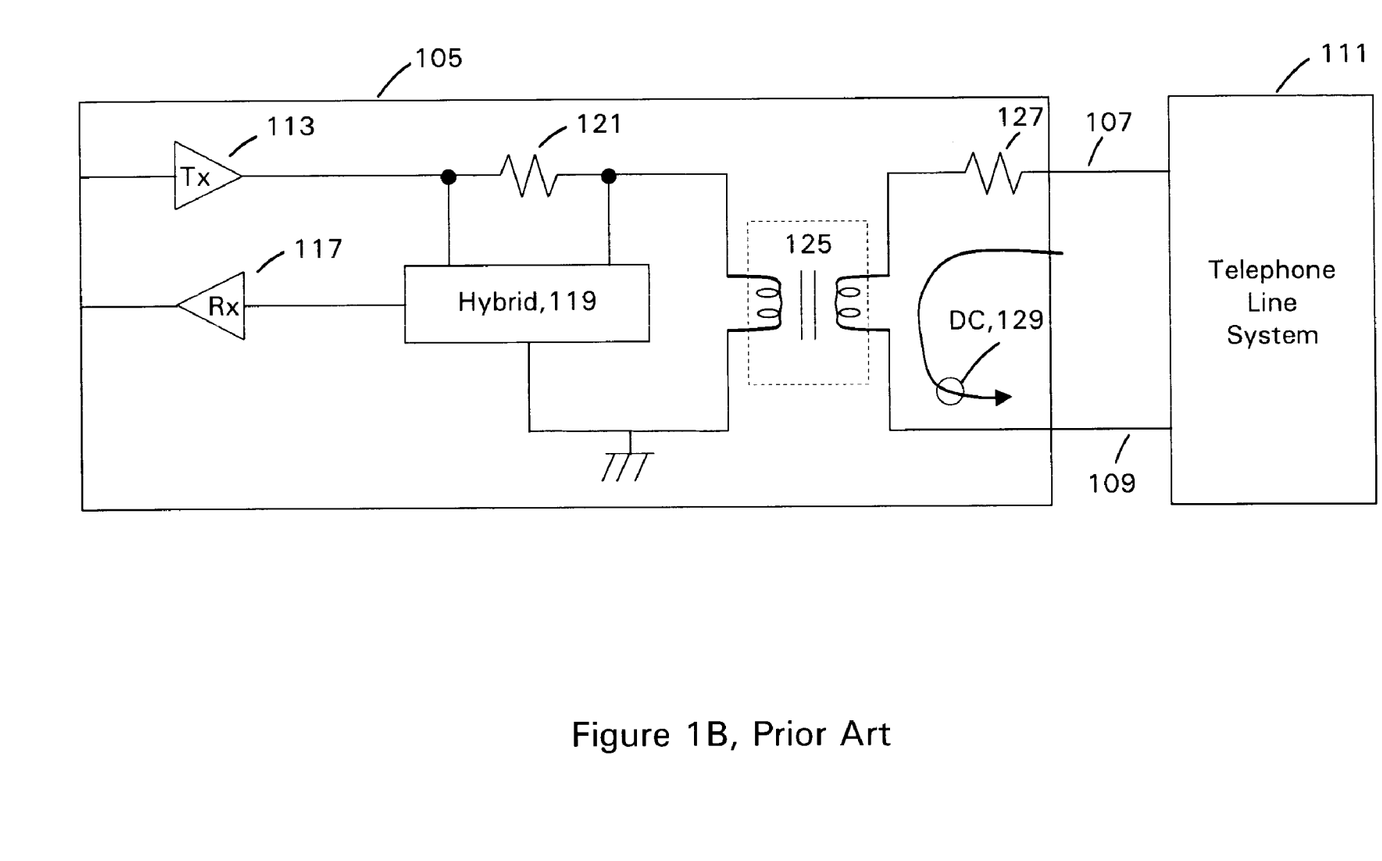

From the early days of telephone modems and telephone line equipment in general isolation is required between the telephone modem system 103 and the telephone system 111. The purpose of this requirement is to decouple any difference voltage potential between the telephone modem 103 and the telephone system 111. Furthermore, the isolation protects the user of the telephone modem from such things as lightning strikes within the telephone system 111, which could be destructive to the system and fatal to the user without adequate isolation. A transformer, such as 125 illustrated in FIG. 1B, were commonly used to address this isolation requirement. Typically, at least one driver, such as illustrated in FIG. 1B as 113, drives the transformer. Additionally, each driver circuit typically includes a resistor such as 121, which are used to set the impedance of the DAA seen by the phone line. The same transformer 125 may also be used for reception of signals. Signals are commonly coupled from the transformer 125 into a circuit known as a hybrid 119 and then further coupled into a receive amplifier 117. Generally, the function of the hybrid circuit 119 is to couple signals received from the telephone system to the receive amplifier 117 often after cancelling as much as possible of any transmit signal injected to the telephone line transmit buffer 113.

In the early days of modem development, the transformer 125 was used to carry DC "loop" current 129 from the telephone line as well as AC communication signals to and from the telephone line. Transformers with windings that carry DC current as well as AC signals are sometimes called "wet" transformers. The DC loop current 129 conducted by a wet transformer functions to inform the telephone system 111 that the modem is ready to communicate AC signals to and from a central office (CO) communications are impending. The process of causing a DC current in the telephone line is commonly referred to as going off-hook or seizing the telephone line. The magnitude of the DC current 129 used to inform the telephone system 111 that lines 109 and 107 are being seized is generally between 20 to 100 milliamps, depending on the distance of the modem system to the (CO).

Generally wet transformers used in modems had a limiting resistor 127, to set the DC resistance of the modem seen from the telephone line within specified limits. A typical current limiting resistor (e.g. 127) has a value of, for example, about 150 ohms and is typically placed in series with a primary winding of a transformer 125, which also commonly has a resistance of about 150 ohms. The addition of the transformer winding resistance and resistor resistance results in an additive DC resistance of approximately 300 ohms. The telephone line system 111 is, thus, presented with this 300 ohms resistance when a user goes off-hook.

Figure 2:
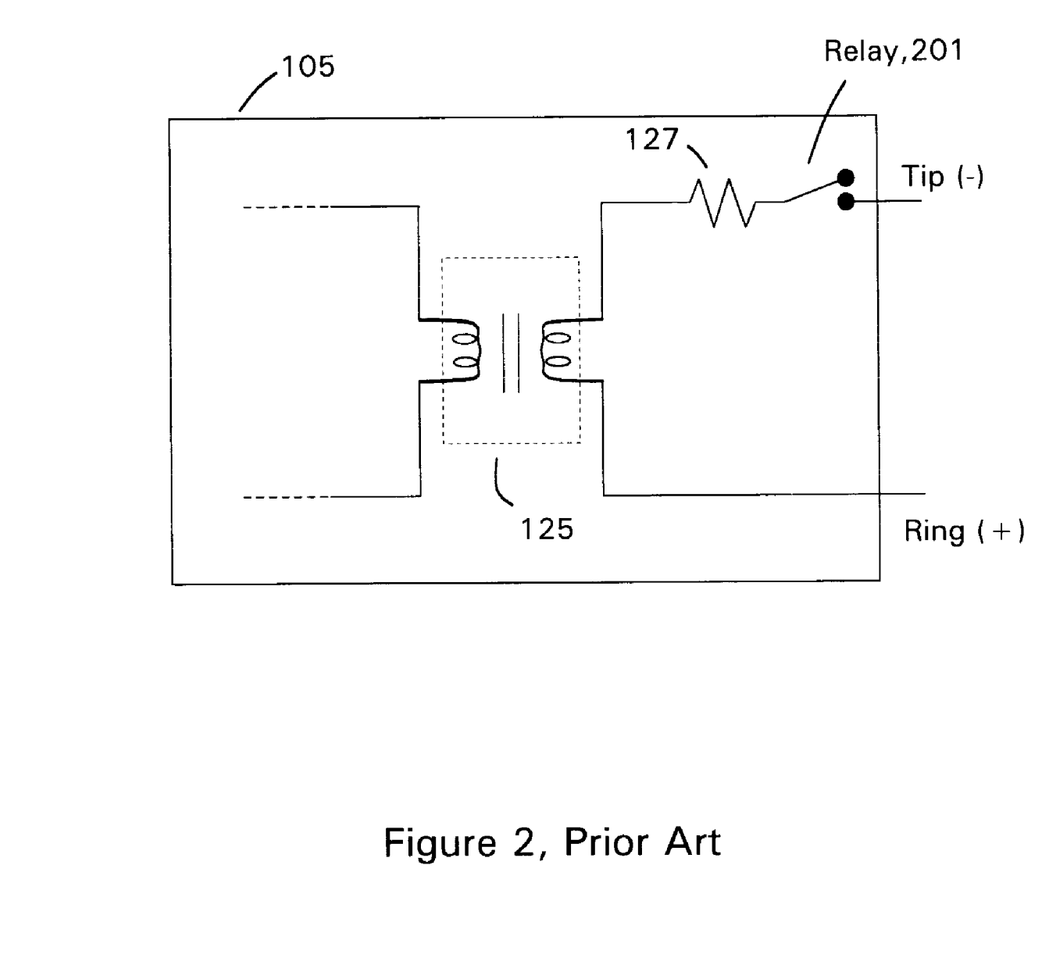

An example arrangement for a wet transformer to provide off-hook current is shown in FIG. 2. The arrangement includes a relay 201, in series with the current limiting resistor 127. The closing of relay contact 201 couples the serial combination of the primary transformer 125 and resistor 127 to the telephone system. An advantage of a wet transformer system is that its primary winding is not polarized. Therefore, while FIG. 2 shows one example in which the resistor 127 side of the transformer 125 is coupled to the tip-line, coupling the resistor 127 to the ring side of the transformer would work equally well. Many early low-speed modems were configured with wet transformers.

Figure 3:
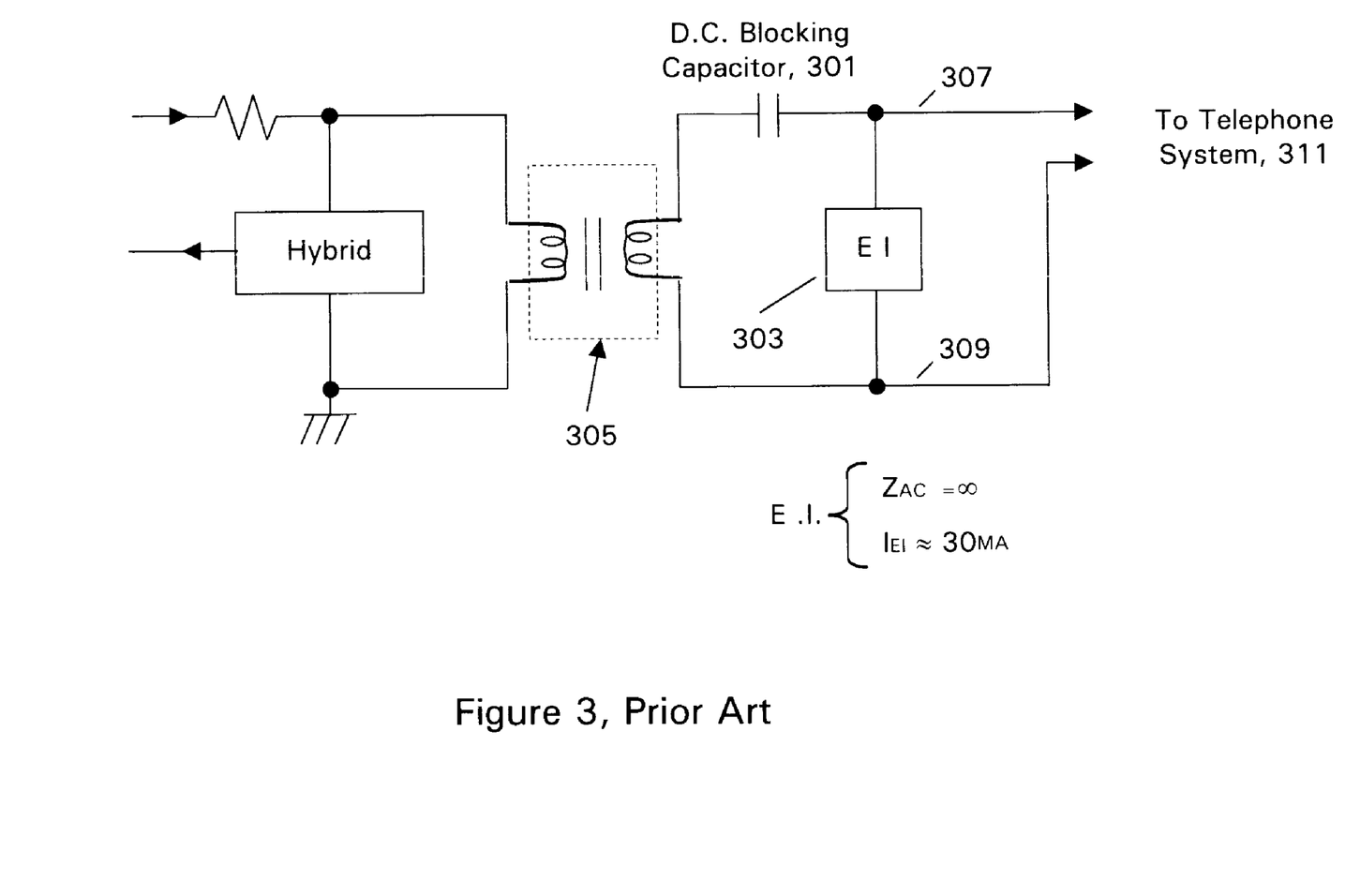

However, wet transformers tend to exhibit nonlinear operation when DC current flows through the primary winding which can be problematic for higher speed modems. Because a transformer is a mechanical device, it is subject to such variations as magnetization, temperature variations and varying permeability. In addition, as the amount of current passing through its primary winding changes, so does the permeability of the transformer's core. Modem systems generally function by detecting phase differences in incoming signals. As the speed of modem transmission increases above 2400 baud, modem systems became less tolerant of the distortion introduced by wet transformers, and wet transformers became less practical and more expensive to build than "dry" transformers for a specified linearity characteristic. FIG. 3A illustrates a dry transformer arrangement.

In FIG. 3, a direct current (DC) blocking capacitor 301 prevents DC from passing through the telephone line side primary winding of transformer 305. Because no DC passes through the primary of transformer 305, the linearity of the transformer 305 can be substantially improved over the wet transformer system, for the same physical size and cost. The dry transformer system does not inherently provide a path for the off-hook DC current however, and, so, another method is needed to provide the DC current for signaling the telephone system of an off-hook condition.

To draw off-hook current, a system referred to as an electronic inductor (EI) 303 was included with the dry transformer arrangement. An electronic inductor 303 has the ability to conduct off-hook DC current but appear as high AC impedance. It is beneficial for the electronic inductor 303 to appear as a high AC impedance so that the electronic inductor 303 does not contribute AC loading to either the transformer 305, or to the telephone system 311. The AC impedance value of the electronic inductor 303 is important because, in modern high-speed modems, an AC bandwidth from 10 hertz to 3.4 kilohertz is commonly desired and any impedance in parallel with the telephone line may affect the bandwidth of the signal and ultimately the performance of the system. Therefore, the electronic inductor must exhibit high impedance at frequencies from 10 hertz to 3.4 kilohertz and such as a coil, a passive inductor is not practical to use because its impedance is $2\pi$ times the frequency of a signal, times the inductance. In order to use a passive inductor to provide high impedance to a 10-hertz signal, the inductance would be unacceptably large, and the physical size of the inductor impractical.

Figure 4:
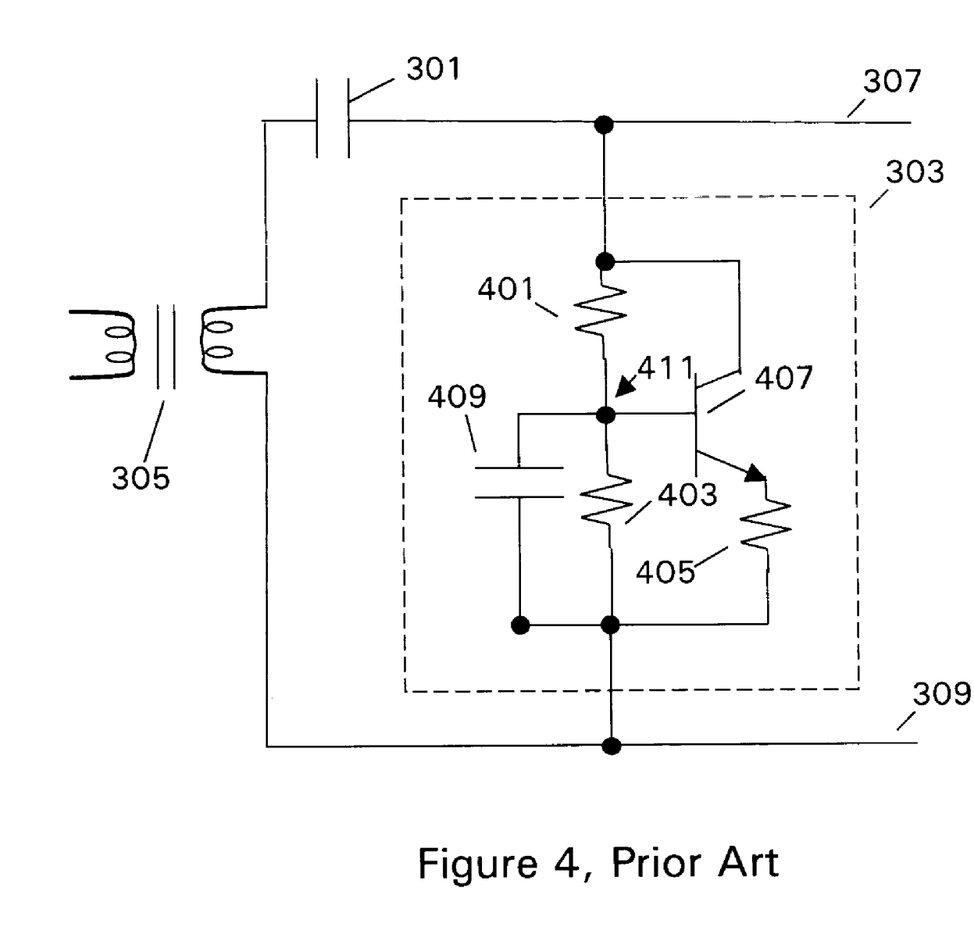

FIG. 4 illustrates an electronic inductor circuit 303. The DC current conducted by the electronic inductor is conducted primarily through the transistor 407 and resistor 405. The voltage at the junction 411 of resistors 401 and 403 determines the level of current through the transistor 407. The voltage at junction 411 is applied to the base of transistor 407, thereby holding the emitter of transistor 407 at a voltage equal to the voltage at 411 minus the voltage drop across the base-emitter junction of the transistor 407. Because the emitter-based voltage of transistor 407 is relatively constant, resistor 405 will determine the current through transistor 407 and consequently the current drawn by the electronic inductor 303 based on the bias voltage set at node 411. In order to keep the AC impedance of the electronic inductor high, a large capacitor 409 is provided at the base of transistor 407. To block AC signals, the series combination of capacitor 409 with the Thevenin equivalent of resistors 401 and 403 with capacitor 409 is the predominant factor determining the frequency response. Common exemplary values for resistor 407 and capacitor 409 are 50 K$\Omega$ and 10 uf, respectively. The serial RC combination of 401 and 409 provides high equivalent AC impedance for very low frequencies, such as 10 hertz.

Figure 5:
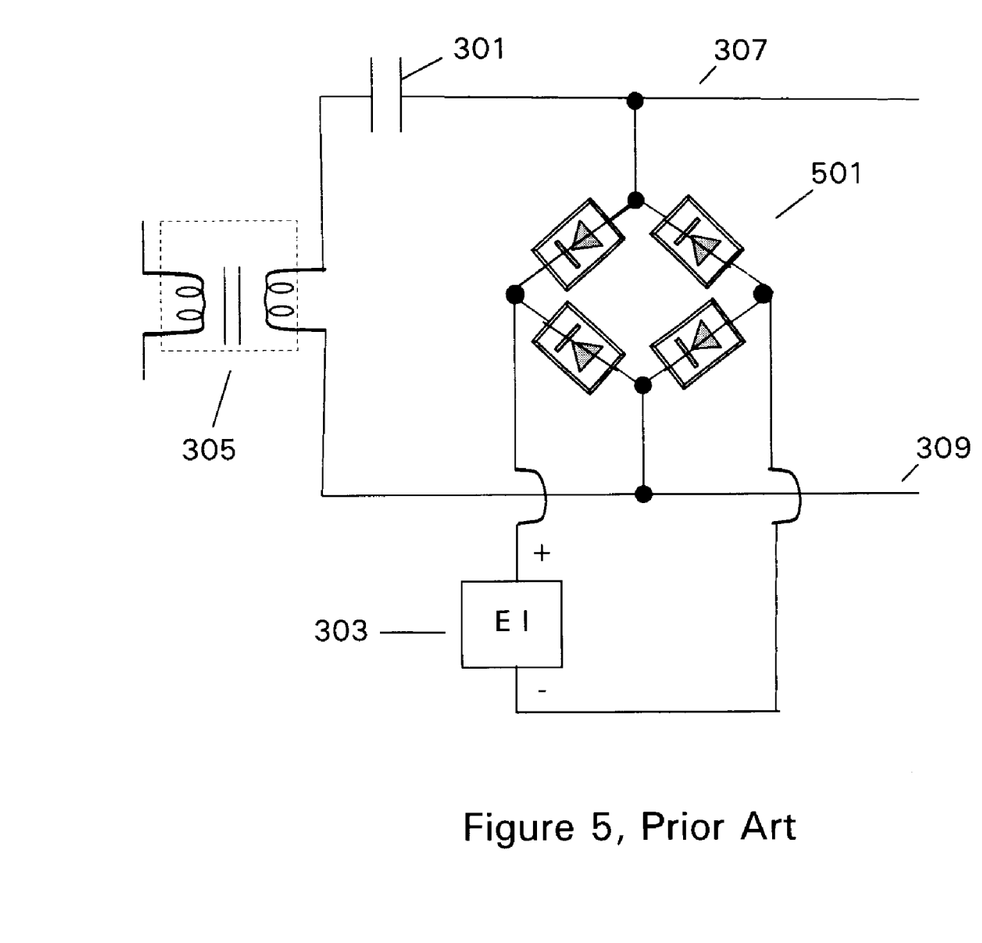

Electronic inductor 303, however, still exhibits problems relating to the polarities on the lines 307 and 309. Transistor 407 is operational as an electronic inductor in FIG. 4 only if line 307 is positive (Ring) and line 309 is negative (Tip). In common telephone wiring, there is no guarantee which line is positive. Accordingly, a common approach is to use a diode bridge 501 to guarantee correct polarity, as shown in FIG. 5. Typical telephones and other telephone equipment in general also commonly use diode bridges to ensure correct polarity. By using a diode bridge 501, the ring signal, which is by definition positive, is directed into the collector of transistor 407 of the electronic inductor 303, or the positive terminal of EI 303.

Although some modern applications do not use transformers, most DAA circuits commonly include polarized circuit components, for instance transistors. Because the DAA circuits are polarized, diode bridges are commonly used to insure correct polarity. Diode bridges, however add to the overall circuit cost, and can also contribute to circuit noise.

SUMMARY OF THE DISCLOSURE

Accordingly, to overcome limitations in the prior art described above, and to provide other advantages that will become apparent upon reading the present specification, preferred embodiments of the present invention relate to telephone line coupled devices, such as modem DAAs, which dispense with the need for a diode bridge.

A preferred embodiment of the present system involves a system for providing correct polarity signals without the use of a diode bridge.

In particular embodiments, the present invention provides a method and apparatus for switching incorrect polarity signals presented to a DAA.

A popular method for providing a modem is through the installation of a modem card into a personal computer. Modem cards inserted into a personal computer typically have two telephone jacks on one card. When installing a modem card, the user commonly connects one of the telephone jacks to the telephone outlet in the wall (or wall jack). The other telephone jack often provides a connection for a telephone, which may have previously been coupled to the wall jack and was disconnected to allow the modem card to be coupled to the wall jack. Such dual connectors on a personal computer modem card are commonly labeled "phone" and "wall," "phone" and "line" or some other similar nomenclature. Although labeled separately, the telephone jacks on the modem card are often internally coupled together interchangeably such that there is no electrical difference between jacks. Embodiments of the present invention, which may be utilized in personal computer modems, provide for two telephone jacks wired in opposite polarity or a single jack whose polarity may be switched. Embodiments of the present invention provide that the tip signal on one jack will be the ring signal on the other jack and visa versa. In embodiments having 2 oppositely wired jacks, by plugging the telephone line into the correct jack, a correct polarity may be instituted in a DAA circuit or any polarized circuitry, without the use of a diode bridge. In embodiments having a jack with a switchable polarity if it is incorrect the correct polarity may be assured without the use of a diode bridge. Embodiments of the present invention provide, in addition to oppositely wired input jacks or switchable polarity, a method for insuring that the jack polarity is correct.

BRIEF DESCRIPTION OF THE DRAWINGS

Referring now to the drawings, in which consistent numbers refer to like elements throughout.

FIG. number 1B is a combination circuit and block diagram illustrating an arrangement of circuitry as may be used to provide a DAA function.

FIG. number 2 is a circuit diagram illustrating a method for providing off-hook current to a telephone system, using a "wet" transformer.

FIG. number 3 is a combination circuit and block diagram illustrating the use of a dry transformer to connect to a telephone system.

FIG. number 4 is a circuit diagram illustrating an exemplary circuit, which may be used to provide an electronic inductor function within a DAA.

FIG. number 5 is a circuit and block diagram illustrating an electronic inductor coupled through a diode bridge, to provide proper polarity connection to a telephone system line.

DETAILED DESCRIPTION OF PREFERRED EMBODIMENTS

In the following description, reference is made to the accompanying drawings, which form a part hereof, and in which is shown by way of illustration specific embodiments in which the invention may be practiced. Other embodiments may be utilized as structural changes may be made without departing from the scope and inventive concepts of the present disclosure.

Accordingly, embodiments of the present invention relate, generally, to telephone line coupled devices. However, for the purposes of simplifying this disclosure, preferred embodiments are described herein with relation to computer modems and, in illustrative embodiments, to circuit cards which provide modem capabilities to personal computers. The examples disclosed are intended to illustrate the inventive aspects of this disclosure, and not to limit the invention to the illustrative embodiments disclosed.

Figure 6A:
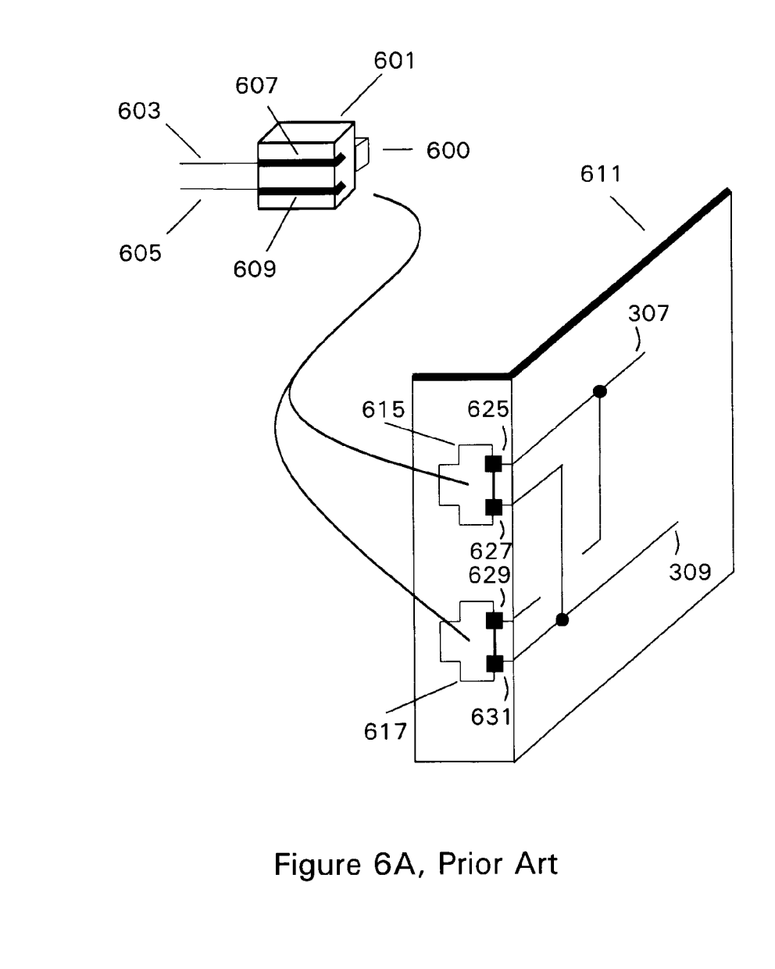
FIG. 6A is a graphical illustration of a prior art modem card as may be inserted in a personal computer.

FIG. 6A is a graphical illustration of a common, prior art modem card. The modem card 611 is configured for insertion into a slot within a personal computer. The modem card 611 commonly contains two jacks designed to accept telephone type plugs. These two jacks are labeled 615 and 617 in FIG. 6A. Typically, the two telephone jack receptacles, 615 and 617, are provided with labels such as "wall" and "phone," line and "phone" or other similar nomenclature. Commonly there is no electrical difference between the jacks and they are wired in parallel. Telephone jacks 615 and 617 generally comprise two electrical connections, although they may comprise more than two. Jack 615 comprises electrical connections 625 and 627 and jack 617 comprises electrical connection 629 and 631.

A typical telephone plug 601 for engaging and electrically connecting to any one of the jacks 615 and 617, is illustrated in FIG. 6A. The telephone plug 601 comprises a set of wires 603 and 605 coupled to contacts 607 and 609 respectively. Commonly a key 600 is used to orient and retain a plug 601 within a jack (e.g. 615). When the telephone plug 601 is inserted into jack 615, wire 603 is electrically coupled to contact 625 and thereby to line 307. In like manner wire, 605 is electrically coupled to contact 627 and thereby line 309.

If the same plug 601 is inserted into the second telephone jack 617, wire 603, is electrically coupled to contact number 629 and thereby coupled to wire 307. Additionally, wire 605 is electrically coupled to contact 631 and then further coupled to conductor 309 within the card. In other words, the telephone plug 601 may be inserted into either one of the telephone jacks 615 or 617, yet the electrical connection is the same. Even if circuit board layout constraints force the jacks to be wired oppositely, no distinction is made because current telephone line coupled equipment is designed to use any polarity.

Figure 6B:
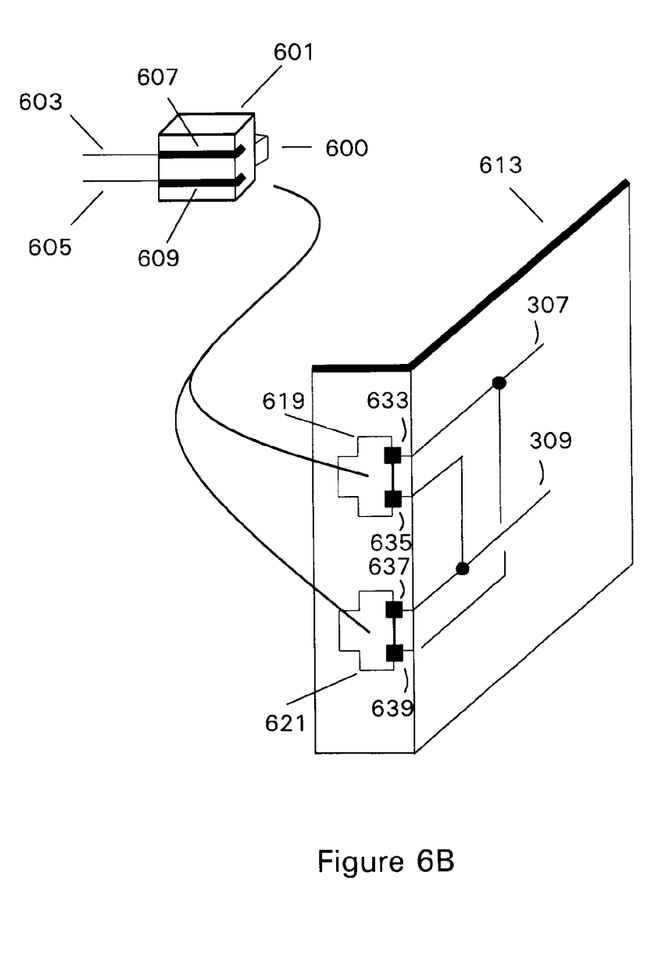
FIG. 6B is a graphic illustration of a modem card according to an embodiment of the invention, as may be inserted in a personal computer.

FIG. 6B is a graphical illustration of a similar modem card, however, configured according to an embodiment of the invention. Modem card 613 also contains two telephone jacks 619 and 621, each configured to accept a standard telephone plug 601. When the telephone plug 601 is inserted into telephone jack 619 in FIG. 6B, wire 603, which is coupled to contact 607 on the telephone jack 601, is electrically coupled to contact 633, which is further coupled to line 307. Likewise, wire 605, which is coupled to contact 609 on the telephone plug 601, becomes electrically coupled to contact 635 and thereby further coupled into wire 309. However, if the telephone plug 601 is inserted into telephone jack 621, wire 603, which is coupled to contact 607, becomes further coupled to contact 637 and wire 309. Wire 605, which is coupled to contact 609, becomes electrically coupled to contact 639 and thereby further coupled to wire 307.

In other words, when telephone plug 601 is inserted into telephone jack 619, wire 603 is coupled to conductor 307 and wire 605 is coupled to conductor 309. When telephone plug is inserted into telephone jack 621, however, wire 603 is coupled to conductor 309 and wire 605 is coupled to conductor 307. By selecting either telephone jack 619 or 621, the polarity of the telephone jack 601 may be reversed with respect to conductors 307 and 309 within the modem card. In this manner, one of the jacks 619 and 621 will have proper polarity relative to the polarity (tip or ring) of the wires 603 and 605.

Jacks 619 and 621, on modem card 613, are functionally equivalent when coupled to a telephone. Telephones have diode bridges or other mechanisms within them to direct the negative and positive polarities of the telephone line correctly to the electronics of the telephone, in order to account for the possibility of reversed polarities.

By instructing a user of the modem card 613 to insert the telephone plug 601 into the proper telephone jack, either 619 or 621, the need for the diode bridge within the modem connection could be eliminated. Instead of directing the polarity of the telephone line using a diode bridge, the user is directing the polarity of the telephone line by inserting the telephone plug into a jack wired for the corresponding polarity. The other jack may be used for the telephone.

One method to assure that the plug is inserted into the correct jack is to first allow the user to insert the plug into a random jack. Once the plug is inserted, polarity of the telephone line voltage may be determined and then the user may be informed, for example, to switch receptacles in the case that the polarity is incorrect. If the user selects the correct polarity, no correction is needed. If the user has a telephone plugged into the second jack and the incorrect polarity is selected, then the user must switch both the plug coupled to the telephone and the plug coupled to the telephone line. The telephone will operate equivalently when coupled to either jack.

Figure 6C:
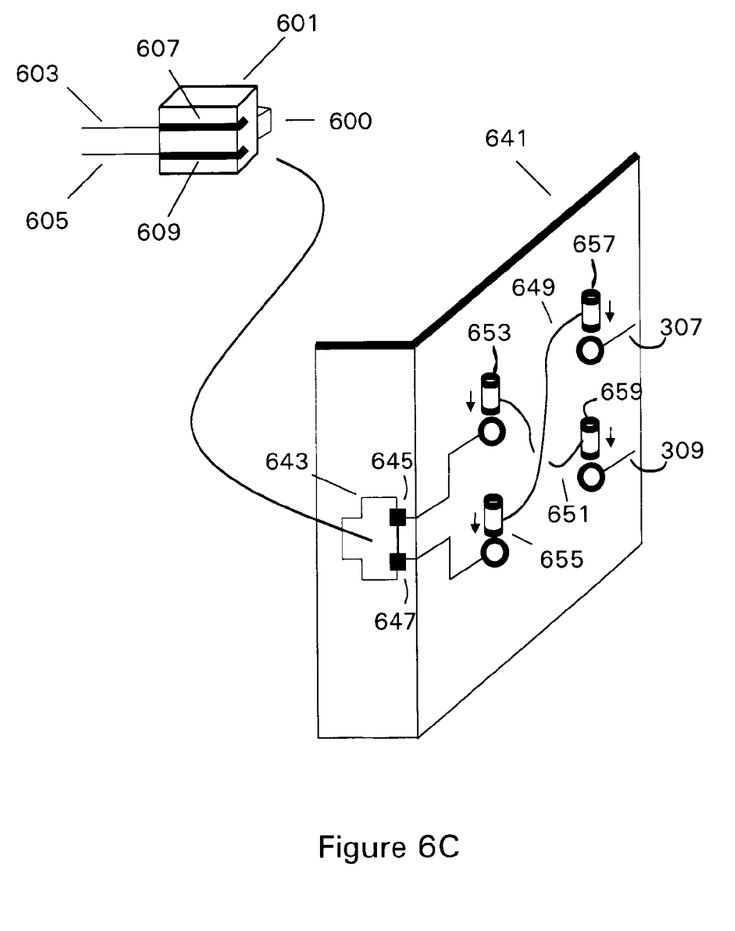
FIG. 6C is a graphic illustration of a modem card with one phone jack according to an embodiment of the invention.

Alternatively a single phone jack may be used. Polarity on a single phone jack may be switched through the use of inexpensive jumper wires on the modem card. The use of jumper wires to switch polarity is illustrated in the embodiment shown in FIG. 6C. Jumper wires 649 and 651 are used to connect contacts 645 and 647 with lines 307 and 309. In the illustration in FIG. 6C, contact 645 is coupled to line 309 and contact 647 is coupled to line 307. By reversing the position of jumper wire contacts 653 and 655 and jumper wire contacts 657 and 659, the jack 643 polarity may be reversed from the polarity illustrated in FIG. 6C. Similarly by reversing the position of jumper wire contacts 657 and 659 the jack 643 polarity may be reversed from the polarity illustrated in FIG. 6C.

Figure 7:
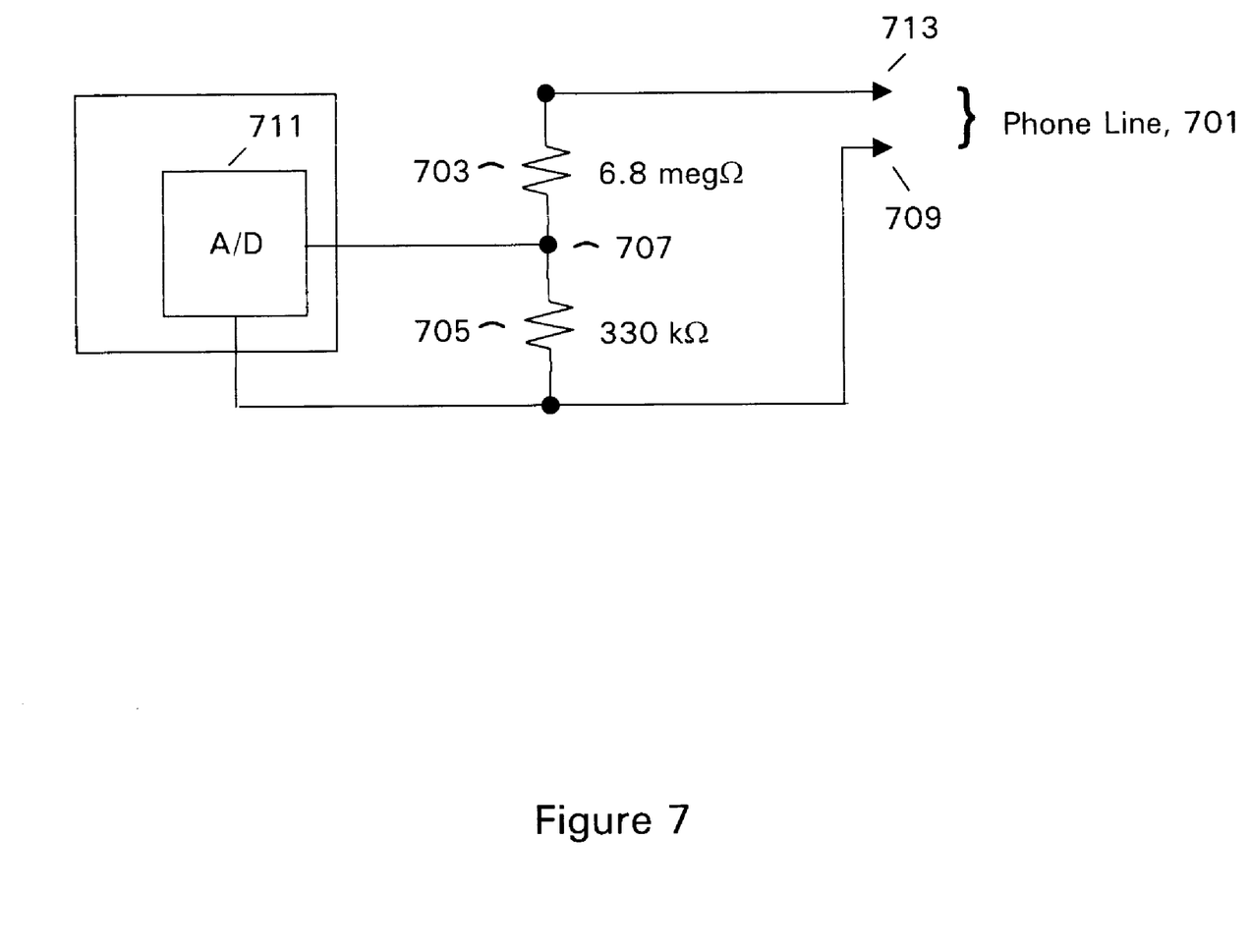
FIG. 7 is a combination block and circuit diagram illustrating circuitry used to detect incorrect polarity according to an embodiment of the present invention.

The polarity of the line voltage may be determined using any suitable circuits. An example of a circuit for determining line voltage is illustrated in FIG. 7. The telephone line 701 is coupled to a voltage divider comprising resistors 703 and 705. In the present exemplary embodiment resistor 703 is 6.8 megaohms and resistor 705 is 330 kilo ohms. Those skilled in the art will realize that the resistor values may be adjusted depending on the application. The junction of the divider network 707 is coupled into an analog-to-digital (ADC) converter 711. Voltage divider point 707 is referenced with respect to point 709. If the telephone line 701 is coupled so that point 713 is positive (ring) with respect to point 709 (Tip), ADC 711 will register a positive voltage. If, however, point 713 is negative (Tip) with respect to point 709 (ring) then the ADC 711 will read a negative voltage or 0 volts, if the ADC range cannot be negative. If the ADC 711 reads negative voltage or 0, it will have detected an incorrect polarity. The user then must switch the telephone plug from the telephone line to the opposite jack. Alternatively, the user may simply try the modem after inserting the telephone plug. If the modem does not work, for example if no dial tone is detected, the user may be instructed to switch the jacks coupled between the wall and the modem card.

Figure 8A:
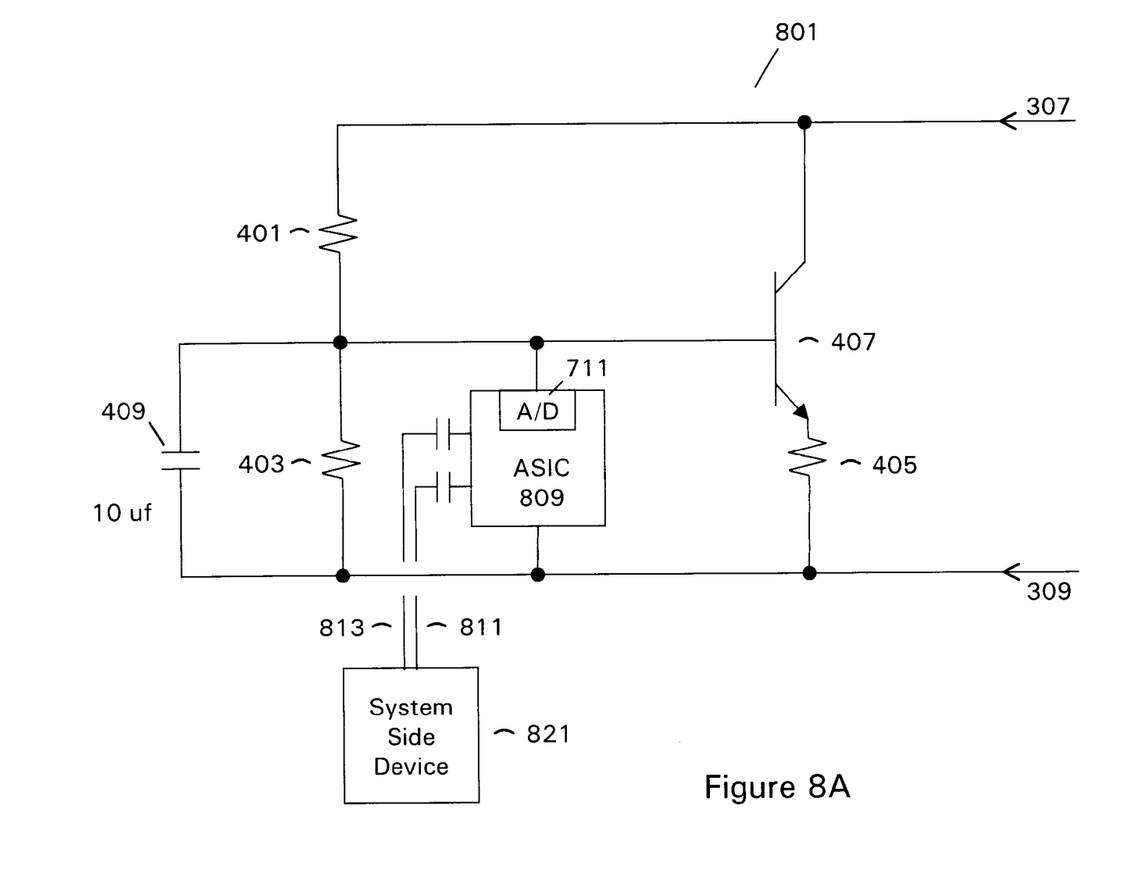
FIG. 8A is a combination block and circuit diagram illustrating circuitry according to an embodiment of the present invention.

FIG. 8A is an illustration of an electronic polarity detection circuit, such as that in FIG. 7, contained within an Application Specific Integrated Circuit (ASIC) 809. The ASIC 809, along with other functions, integrates electronic inductor circuitry as depicted in FIG. 4 and the ADC 711. Information may be communicated from the ADC 711 within the ASIC 809, back to the user system. The user system, represented by the system side device 821, may receive communications from the ASIC 809 through lines 813 and 811. The system side device 821 may be informed if the voltage is incorrect or correct through measurements from the ADC 711, which are provided to the system side device 821. The device 821 may be provided with a suitable user display or other interface for advising the user of the measurement. For example, the device 821 may provide a signal to a personal computer so that an appropriate message may be displayed to the user. Alternatively, the device 821 may provide an indicator such as an audio feedback, or a LED (Light Emitting Diode) indicator to inform the user of the correctness or incorrectness of the phone line polarity. The ADC 711 can be as a comparator (one bit ADC) with a fixed voltage reference.

If the approach of attempting to use the modem to determine if the telephone line polarity is correct is taken and there may be no ADC 711 present, the circuit configuration of FIG. 8A may exhibit a problem with a reverse current in transistor 407. Such problem arises when line 309 is positive with respect to line 307. Transistor 407 may also conduct current in the reverse direction. That is transistor 407 may conduct current from 309 to 307. This current, depending on a variety of factors, may provide problems such as excessive on-hook current, on-hood current is generally limited to 10 micro-amps.

Figure 8B:
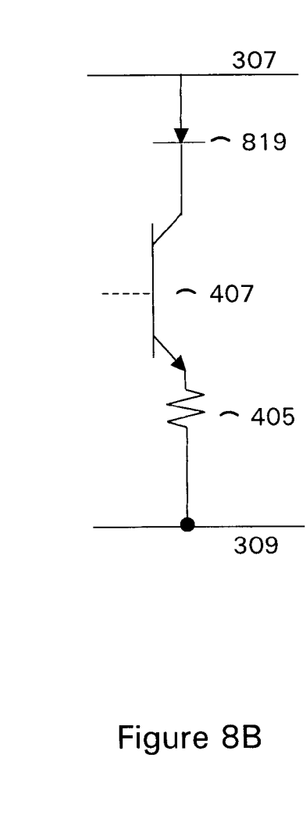
FIG. 8B is a circuit diagram of an altered portion of the circuitry presented in FIG. 8A according to an embodiment of the present invention.

One solution to the reverse conduction problem is illustrated in FIG. 8B. In FIG. 8B, a diode is inserted in series with the electronic inductor output transistor 407. By inserting diode 819 in series with the electronic inductor, the electronic inductor conducts current only in the correct direction, or does not conduct at all. The protection diode 819 will, thus, inhibit transistor 407 from operating in the reverse direction. Diode 819 could be an LED type visible to the user on the computer modem card, for example, which in itself would indicate a correct polarity if LED 819 turns on when the telephone line is connected (current flows through the LED) or an incorrect polarity if the LED 819 remains off (reverse biased) after the telephone line is connected.

Alternatively, diode (or LED) 819 could be located in series with the emitter of transistor 407 (or resistor 405). In this position, diode (or LED) 819 would not be required to have high reverse-voltage rating because the voltage between the base of transistor 407 and ground is limited the circuitry of ASIC 809.

In addition to cost savings associated with eliminating the need for a diode bridge, embodiments of the invention can improve modem performance and help reduce modem radiated and conducted emission for Electro-Magnetic Interference (EMI) compliance. One reason for performance improvement is illustrated in FIG. 9.

Figure 9:
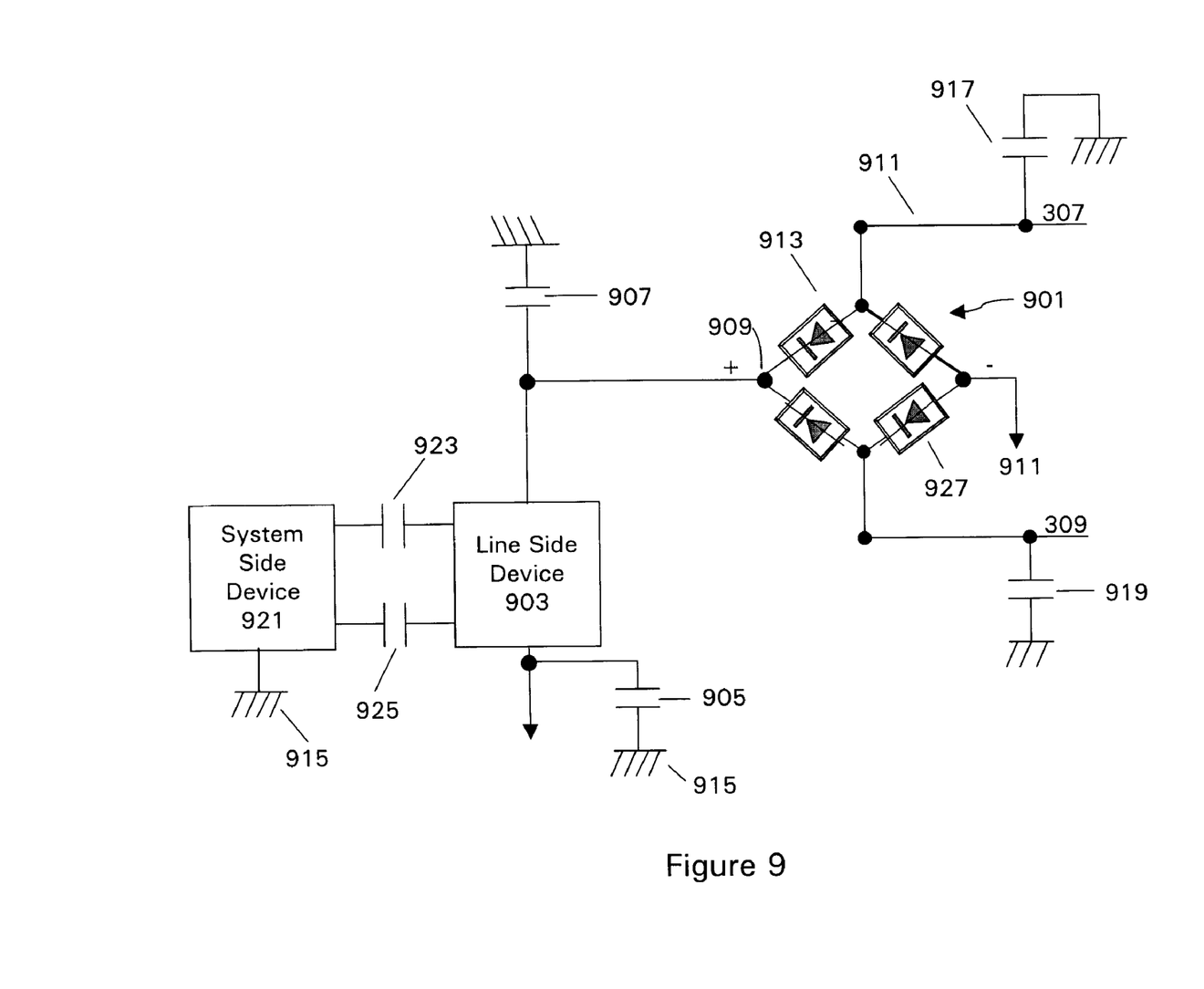
FIG. 9 is a graphic illustration of circuitry illustrating problems encountered with the use of a diode bridge.

FIG. 9 is a part schematic and part block diagram of a system containing a diode bridge 901. In an arrangement as shown in FIG. 9, a difficulty arises when capacitor 907 is added from node 909 (+ terminal) of bridge 901 to chassis ground 915, and capacitor 907 is added from node 911 (− terminal) of bridge 901 to chassis ground 915. Capacitors 907 and 905 may be required to facilitate EMI compliance or improve signal balance between chassis ground and Tip and Ring, respectively. Chassis ground 915 is also the chassis of the PC where the modem card is installed, and can be referred to simply as PC chassis.

Capacitors 917 and 919 are typical of most traditional modem designs, and are generally added from Tip 307 and Ring 309 to PC chassis 915, to suppress EMI emission from the modem external jack. To be effective, however, such capacitors must be physically located as close as possible to the external jack where the telephone line is coupled. This layout configuration prevents EMI radiation from being coupled to the modem telephone cord.

Silicon-based DAA's, however, typically use an integrated line side device 903 on the isolated side of the DAA system and receive digital clocks and data from the system side device 921 through capacitors 923 and 925, for example. Under these conditions, capacitors 905 and 907 are often essential to provide a short return path to digital noise injected from the system side to the line side device, if placed at strategic locations on the modem printed circuit board layout. EMI capacitors 917 and 919 could not serve this purpose because they are coupled to nodes 307 and 309 "before" the diode bridge, as opposed to nodes 909 and 911 "after the diode bridge," and their physical location must be close to the external jack and cannot be arbitrary.

When adding capacitors 907 and 905 on the line side device, a hum noise problem may result on all telephone equipment connected in parallel with the modem system in a household, for example. In this context, hum noise is defined as noise heard on telephone equipment in a household, when a modem is permanently connected in parallel to the same telephone line. This effect generally occurs only if there is a noisy difference of potential or "electrical noise" between the telephone line and the chassis of the PC where the modem is installed.

Figure 10:
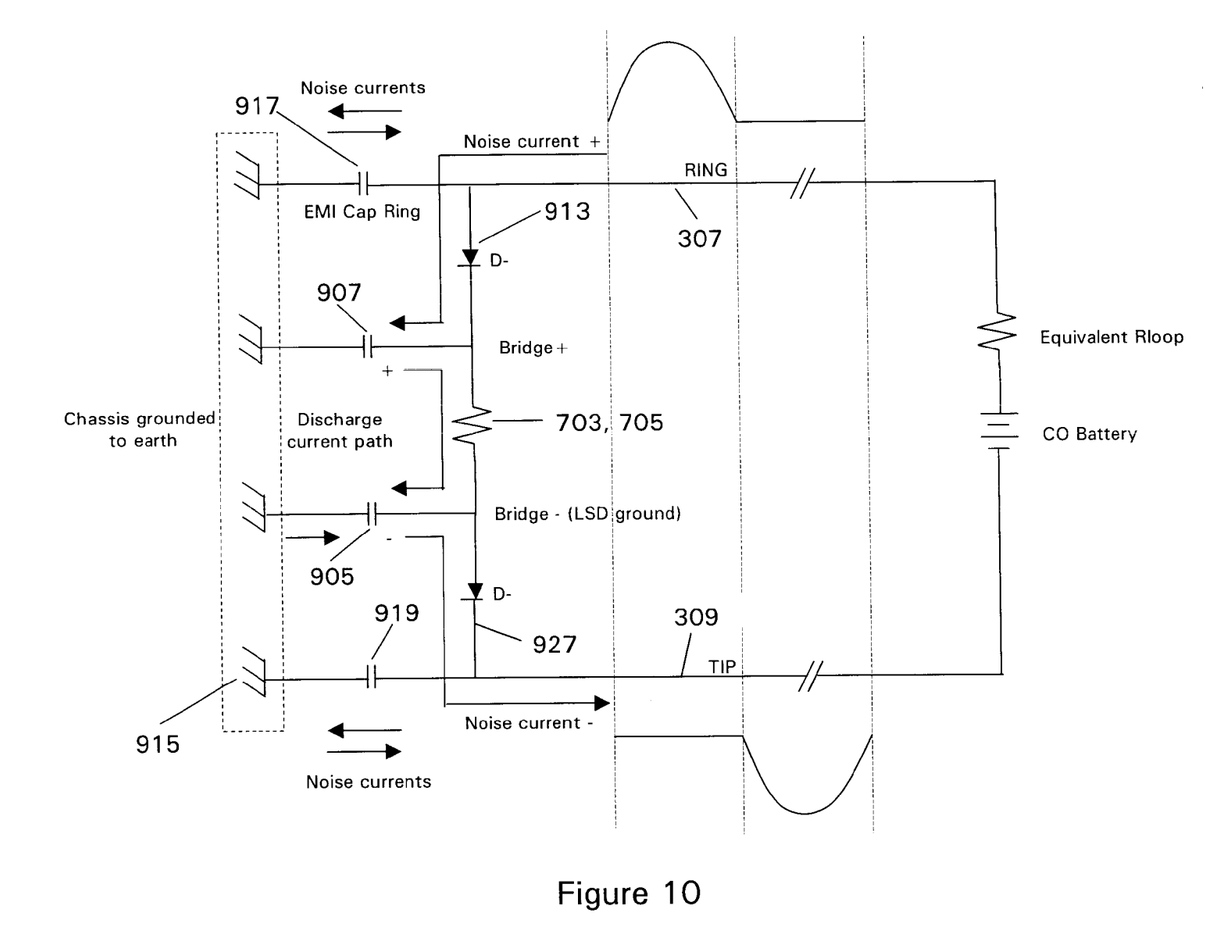
FIG. 10 is a circuit diagram of a typical DAA.

To understand how this electrical noise translates into hum noise on telephone equipment connected in parallel with the modem, consider the simplified diagram of a typical DAA shown in FIG. 10. The circuit shows only components directly involved in the generation of hum noise, specifically diodes 913 and 927 of diode bridge 901, the only two diodes forward-biased in the bridge for a given polarity of the telephone line voltage; resistor 703–705 between+terminal 909 and the − terminal 911 of bridge 901; and capacitors 907 and 905 from chassis ground 915 to + terminal 909 and − terminal 911 of bridge 901, respectively. EMI capacitors 917 and 919 do not take part in the generation of hum noise, but they are shown for explanation purposes.

Resistor 703–705 represents the equivalent series effect of resistors 703 and 705, respectively. This resistance typically provides bias to the electronic inductor while the modem is off-hook (primary function), and may allow an ADC to read the telephone line voltage while the modem is on-hook to implement various modem features such as Line-In-Use, for example.

Capacitors 907 and 905 can be added to the modem circuit to reduce EMI emission and to balance any noise injected into the telephone line from PC chassis 915. Generally, electrical noise can be present on PC chassis 915 with respect to the telephone line when earth ground, i.e., the power outlet ground, is noisy with respect to the telephone line, a condition often encountered in realistic installations.

In reference to FIG. 10, noise currents between earth ground 915 and Ring 307 or Tip 309 can flow in and out of EMI capacitors 917 and 919 at the same time, resulting in a simultaneous or "balanced" current flow into Tip and Ring (this assumes that capacitors 917 and 919 are approximately equal in value, or "balanced"). Since a telephone connected on the same telephone line as the modem detects only the voltage differential between Tip and Ring during operation, the presence of "simultaneous" noise currents injected into Tip and Ring from the modem does not cause a telephone user to hear any noise in the telephone handset. Therefore, the presence of capacitors 917 and 919 does not cause hum noise on a parallel telephone.

On the other hand, the presence of capacitors 907 and 905 can cause severe hum noise on telephone equipment coupled in parallel with the modem, whether these capacitors are balanced or not. The mutual interaction of resistor 703–705 with capacitors 907 and 905 is responsible for hum noise on the telephone line. This noise is a result of noise current imbalance from the PC chassis into Tip and Ring, respectively. For example, noise current 107 can flow from Ring 307 through diode 913 into capacitor 907 (to PC chassis 915), but cannot flow out of capacitor 907 back into Ring 307 because diode 913 would be reverse-biased. Similarly, noise current 103 can flow in only one direction from PC chassis 915 into capacitor 905, through diode 927 to Tip 309.

If resistor 703–705 were not present, capacitors 907 and 905 would get charged and noise currents 101 and 103 would stop flowing after the initial charge-up. However, the presence of resistor 703–705, which is essential in certain modem architectures to reduce overall cost, creates a discharge path 105 for capacitors 907 and 905, as shown in FIG. 10. Since current path 105 allows capacitors 907 and 905 to discharge, noise currents 101 and 103 can continue to flow in and out of PC ground, respectively. The resulting effect is that current flows either through Ring 307 (current 101) or Tip 309 (current 103), but never through both Tip and Ring simultaneously because these currents have opposite polarities, as depicted in waveforms 107 and 109. The unbalanced current flow results in differential noise between Tip and Ring, which can be detected as hum noise by a telephone coupled in parallel with the modem on the same telephone line.

This hum noise is a relatively loud disturbance on the telephone line, which is composed of 60 Hz hum and harmonics and represented by voltage waveform 111. The very nature of this noise makes it virtually impossible to design a filter between modem and telephone line to suppress or even reduce the effect. For example, an LC tank circuit configured as a notch filter would require component values in the order of 1H inductance and 10 uF capacitance, which is prohibitive as far as cost and physical size are concerned. Furthermore, there is no guarantee that harmonics of 60 Hz would be suppressed sufficiently, even if such a filter were used. Lastly, since the quality factor (Q) of a hypothetical filter would be very low, the entire low-frequency audio band of the modem could be compromised, resulting in severe modem performance degradation.

Since the circuit responsible for this effect is virtually independent of the modem functionality, hum noise persists whether the PC is powered on or off, provided that the PC chassis is noisy with respect to the telephone line and the modem is on-hook. When the modem goes off-hook, the hum noise ceases because diodes 913 and 927 are forward-biased with a large loop current compared to noise currents, which makes the diodes virtually conductive in both directions with respect to small noise currents. In this case, noise current injection in and out of the telephone line is balanced, as for the case of capacitors 917 and 919, and the hum noise effect disappears. The effect only occurs while the modem is on-hook because the current through diodes 913 and 927 is less than 10 uA, which lets noise currents in the range of micro-amperes flow forward but not backwards through the diodes. The on-hook current through the diodes cannot be increased to more than 10 uA to reduce hum noise, because of PTT regulations.

It is clear from the above description that removing diode bridge 901 from a typical silicon-based DAA architecture would is very beneficial to reduce EMI emission and eliminate negative side effects associated with a modem in a typical installation environment.

The foregoing descriptions of exemplary embodiments of the present disclosure are presented for the purpose of illustration and description. They are not intended to be exhaustive nor to limit the inventive concepts to the embodiments disclosed. Many modifications and variations are possible in light of the above teaching. It is intended that the scope of the invention be limited not within this detailed description, but rather by the claims appended hereto, which appear below.

What is claimed is:

1. An apparatus for interconnecting a polar circuit to a telephone line, the telephone line comprising first and second telephone line conductors, the apparatus comprising:

a first telephone jack having first and second telephone jack conductors electrically coupled, respectively, to positive and negative sides of a polar circuit and a key for accepting a telephone line in a single orientation, whereby a first telephone line conductor is coupled to the positive side of the polar circuit and a second telephone line conductor is coupled to the negative side of the polar circuit; and a second telephone jack having first and second telephone jack conductors electrically coupled, respectively, to the first and second telephone jack conductors of the first telephone jack and a key for accepting the telephone line in a single orientation, whereby the first telephone line conductor is coupled to the negative side of the polar circuit and the second telephone line conductor is coupled to the positive side of the polar circuit.

2. An apparatus as in claim 1 further comprising a circuit for detecting the correct polarity applied to the polar circuit.

3. An apparatus as in claim 2 wherein the circuit for detecting the correct polarity further comprises:
an analog to digital converter (ADC); and
a circuit to read a value produced by the ADC.

4. An apparatus as in claim 3 wherein the circuit to read the value produced by the ADC is a computer system.

5. An apparatus as in claim 1 wherein the polar circuit comprises a modem DAA circuit.

6. An apparatus as in claim 1 wherein the circuit for detecting the correct polarity comprises a modem circuit, and wherein the modem circuit will not detect a dial tone if its polarity is wrong.

7. An apparatus as in claim 1 further comprising:
a polar telephone modem circuit;
an electronic inductor coupled in parallel to the telephone jack conductors; and
a diode in series with the electronic inductor to prevent the electronic inductor from conducting current in the wrong direction.

8. An apparatus as in claim 7 wherein the diode is a light emitting diode, wherein said diode provides an indication of correct polarity.

9. An apparatus for interconnecting polar circuitry to a telephone line, the telephone line comprising a first and second conductor, the apparatus comprising:
a telephone jack having two conductors and a key for accepting a telephone line in a single orientation, whereby the first conductor is coupled to the positive side of the polar circuitry and the second conductor is coupled to the negative side of the polar circuitry;
a first and second jumper coupled between the telephone jack and the polar circuitry, whereby by exchanging a plurality of connections using the jumpers the connections between the polar circuitry and the telephone jack are reversed;
a polar telephone modem circuit;
an electronic inductor coupled in parallel to the telephone jack conductors; and
a diode in series with the electronic inductor to prevent the electronic inductor from conducting current in the wrong direction.

10. An apparatus as in claim 9 further comprising a circuit for detecting the correct polarity applied to the polar circuitry.

11. An apparatus as in claim 9 wherein the circuitry for detecting the correct polarity comprises modem circuitry, which will not detect a dial tone if its polarity is wrong.

12. An apparatus as in claim 9 wherein the circuitry for detecting the correct polarity further comprises an analog to digital converter (ADC); and a circuit to read a value produced by the ADC.

13. An apparatus as in claim 12 wherein the circuit to read the value produced by the ADC is a computer system.

14. An apparatus as in claim 12 further comprising an indicator for indicating incorrect polarity.

15. An apparatus as in claim 9 wherein the diode is a light emitting diode, wherein the diode provides an indication of correct polarity.

16. A method for providing the correct polarity for a telephone line coupled device comprising a polar circuit, the method comprising:
providing a first telephone jack having first and second telephone jack conductors electrically coupled, respectively, to a positive and negative side of a polar circuit and a key for accepting a telephone plug in a single orientation, whereby a first telephone line conductor is coupled to the positive side of the polar circuit and a second telephone line conductor is coupled to the negative side of the polar circuit; and
providing a second telephone jack having first and second telephone jack conductors electrically coupled, respectively, to the first and second telephone jack conductors of the first telephone jack and a key for accepting the telephone plug in a single orientation, whereby the first telephone line conductor is coupled to the negative side of the polar circuit and the second telephone line conductor is coupled to the positive side of the polar circuit;
detecting incorrect polarity
informing the user to switch telephone line polarity; and
providing the user with means for switching the telephone line polarity.

17. A method as in claim 16 wherein detecting incorrect polarity further comprises:
activating a modem coupled to the telephone line; and
determining if the modem functions properly.

18. A method as in claim 17 wherein determining if the modem functions properly comprises determining if a dial tone can be detected.

19. A method as in claim 16 wherein detecting incorrect polarity further comprises:
measuring the telephone line voltage; and
comparing the telephone line voltage to a range of acceptable values.

20. A method as in claim 19 wherein measuring the telephone line voltage further comprises:
activating an analog to digital converter (ADC); and
reading the value produced by the ADC.

21. The method recited in claim 16 wherein the means for switching the telephone line polarity comprises:
removing the telephone plug from the first telephone jack; and
inserting the telephone plug into the second telephone jack;
whereby the telephone line polarity relative to the polar circuit is reversed.

22. An apparatus for interconnecting polar circuitry to a telephone line, the telephone line comprising a first and second conductor, the apparatus comprising:
a first telephone jack having two conductors and a key for accepting a telephone line in a single orientation, whereby the first conductor is coupled to the positive side of the polar circuitry and the second conductor is coupled to the negative side of the polar circuitry;
a second telephone jack having two conductors and a key for accepting a telephone line in a single orientation, whereby the first conductor is coupled to the negative side of the polar circuitry and the second conductor is coupled to the positive side of the polar circuitry;
a polar telephone modem circuit;
an electronic inductor coupled in parallel to the telephone jack conductors; and
a diode in series with the electronic inductor to prevent the electronic inductor from conducting current in the wrong direction.

23. An apparatus as in claim 22 wherein the diode is a light emitting diode, wherein the diode provides an indication of correct polarity.

24. An apparatus as in claim 22 further comprising a circuit for detecting the correct polarity applied to the polar circuitry.

25. An apparatus as in claim 24 wherein the circuit for detecting the correct polarity comprises modem circuitry, and wherein the modem circuitry will not detect a dial tone if its polarity is wrong.

26. An apparatus as in claim 24 wherein the circuit for detecting the correct polarity further comprises an analog to digital converter (ADC); and a circuit to read a value produced by the ADC.

27. An apparatus as in claim 26 wherein the circuit to read the value produced by the ADC is a computer system.

28. An apparatus as in claim 22 wherein the polar circuitry comprises modem DAA circuitry.

* * * * *